March 21, 1961 J. D. SULLIVAN 2,976,171
GLASS COATED STEEL STRUCTURE AND METHOD OF MAKING THE SAME
Filed Oct. 14, 1957
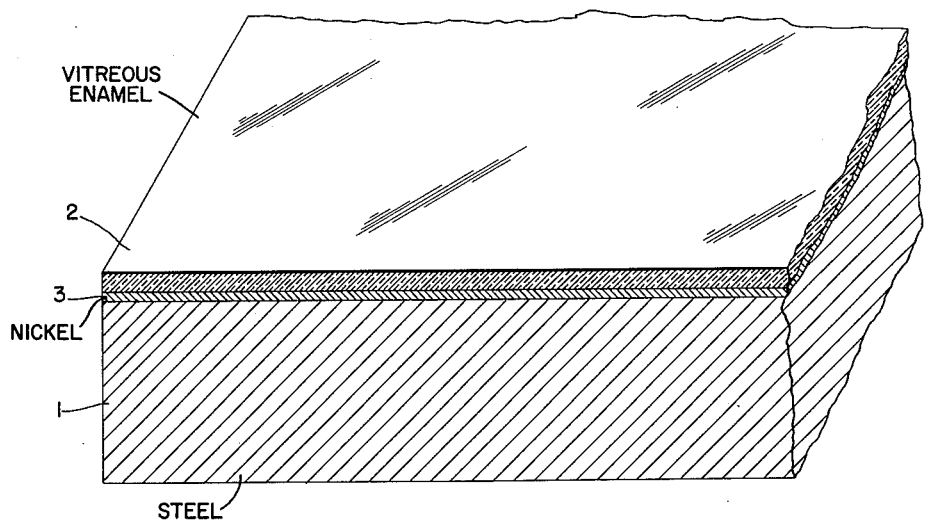
*INVENTOR.*
JAMES D. SULLIVAN
BY
Attorneys

United States Patent Office 2,976,171
Patented Mar. 21, 1961

2,976,171
GLASS COATED STEEL STRUCTURE AND METHOD OF MAKING THE SAME

James D. Sullivan, Milwaukee, Wis., assignor to A. O. Smith Corporation, Milwaukee, Wis., a corporation of New York Filed Oct. 14, 1957, Ser. No. 689,994
3 Claims. (Cl. 117—53)

This invention relates to a process for glassing steel and more particularly to a process for treating steel in preparation for glassing to eliminate hydrogen defects which occur in the glass coating.

Difficulties have been encountered in the past when attempting to coat different types and thickness of steel with glass or vitreous enamel. The glass coating is subject to fishscaling or reboiling defects which are attributable to hydrogen gas evolved during the coating process. during firing of the glass, water, from a number of sources, reacts with the iron to form atomic or nascent hydrogen. The atomic hydrogen has great penetrating power and penetrates the lattice structure of the steel and is believed to accumulate in the voids, rifts or discontinuities of the steel where it combines as molecular hydrogen gas.

After firing, and as the steel is cooled from the firing temperature, the hydrogen gas tends to pass out of the steel as the cooled steel has less capacity to hold the hydrogen than hot steel. The hydrogen gas accumulates beneath the glass coating and exerts a pressure which tends to pop off the coating in what is known as fishscales or causes the glass coating to reboil on subsequent firing.

To minimize the hydrogen defects, resort has been made in the past to the use of bubbly type glasses which contain bubbles or voids. The hydrogen gas which tends to accumulate beneath the glass coating during cooling of the steel, can accumulate within the bubbles in the glass and therefore the pressure exerted beneath the glass coating is minimized. In addition to the bubbly type glass, premium steel or atmosphere firing are also used in order to restrict the presence of hydrogen during the firing operation and to minimize the hydrogen defects.

The present invention is directed to a method of applying a glass coating to steel in which the hydrogen defects are eliminated. In general, the process consists of initially grit blasting the steel surface to provide the steel with a surface roughness in the range of 230 to 450 microinches. The roughened surface is then coated with a layer of nickel by galvanic, electrolytic or chemical reduction processes. After coating with nickel, a conventional glass or vitreous enamel slip is applied to the coated surface and fired at an elevated temperature to fuse the glass to the steel.

The combination of the grit blasted steel surface and the nickel layer serves to eliminate fishscaling and minimize other hydrogen defects which normally occur in a glass coating applied to steel. In addition to the elimination of the hydrogen defects, the nickel coating provides improved adherence between the glass and the steel and eliminates the necessity for adherence promoting oxides, such as cobalt oxide, in the glass composition.

Other objects and advantages of the invention will appear in the course of the following description.

The drawings illustrate the best mode presently contemplated of carrying out the invention.

The drawing is a fragmentary perspective view of a glass coated steel plate having an intermediate layer of nickel.

The drawing illustrates a composite structure including a steel base 1 coated with a glass composition 2 and having an intermediate layer of nickel 3 disposed between the glass and the steel base.

The steel base to which the glass is to be applied may be any conventional carbon steel having a carbon content up to .30%. In this regard, lower carbon steel, commonly referred to as enameling iron and having a carbon content in the range of .01% to .03%, may be employed as the base metal as well as the high carbon steels having a carbon content in the range of .20% to .30%.

The steel is grit blasted with a grit formed of a metal having a hardness generally greater than that of the base metal employed. The grit has a size range as measured by U.S. Standard Sieves of 25 to 40 mesh and is forcibly contacted or blasted against the steel surface by any conventional means, such as air blasting or mechanical or hydraulic methods.

The steel surface, after grit blasting with grit of the above mesh size has a surface roughness in the range of 230 to 450 microinches as measured by a profilometer type Q amplimeter made by the Physicist Research Company. The profilometer measures the average valley depth in microinches figured on a root mean square basis. Therefore, the term surface roughness indicates the average valley depth of the grit blasted surface figured on a root mean square basis.

The nickel can be applied to the grit blasted steel surface by galvanic deposition, electrolytic deposition or by chemical reduction. It has been found that the nickel layer applied to the steel base should be in the range of approximately 0.08 to 0.30 gram of nickel per square foot of steel surface to provide the necessary thickness to eliminate the hydrogen defects and provide the proper adherence between the glass and the steel base. If the nickel concentration is less than the above range, no appreciable reduction of the hydrogen defects is apparent, while if the nickel deposition is above the range, excessive boiling may occur.

The glass to be applied to the steel can be any one of a number of conventional glass or vitreous enamel compositions which are normally applied to a steel base. The glass slip is applied to the steel by spraying, dipping, brushing or the like, and the coated article is then heated to an elevated temperature in the range of about 1000 to 1600° F. to fuse the glass to the steel.

*Example 1*

A 12 inch by 12 inch SAE 1010 steel plate having a thickness of 0.088 inch was grit blasted with No. 40 mesh steel grit to roughen the steel surface to a value of 255 microinches as measured by a profilometer type Q amplimeter.

The grit blasted steel was then dipped in an aqueous galvanic bath containing 1 ounce of $NiSO_4 \cdot 6H_2O$ per gallon of water. The operating temperature of the bath was 170° F. and the pH was adjusted with NaOH and $H_2SO_4$ to a value of 3.5.

The steel was immersed in the bath for 10 minutes which resulted in a galvanic deposition of nickel having an everage thickness of 0.15 gram of nickel per square foot of steel surface.

The nickel coated steel was then rinsed in water and dried.

A glass slip having the following composition in weight percent was then applied to the steel by spraying:

| | Percent |
|---|---|
| Silica | 56.0 |
| Feldspar | 15.0 |
| Borax | 12.0 |
| Soda ash | 7.0 |
| Sodium nitrate | 5.0 |
| Fluorspar | 5.0 |

The glass coated steel was then fired at a temperature of 1580° F. for a period of 8 minutes to fuse the glass to the steel.

The resulting glass coated steel was free of fishscaling and boiling defects and the glass had excellent adherence to the steel.

*Example 2*

A 12 inch by 12 inch SAE 1020 steel plate having a thickness of 0.008 inch was grit blasted with No. 25 mesh steel grit to roughen the steel surface to a value of 380 microinches as measured by a profilometer type Q amplimeter.

The grit blasted steel sample was then made the cathode in an electrolytic bath containing 16 ounces of $NiSO_4$, 2 ounces of $NH_4CL$ chloride and 2 ounces of $H_3BO_3$ per gallon of water. The bath was adjusted in pH with $H_2SO_4$ and NaOH to a value of 5.1.

A nickel-graphite anode was employed and the bath was operated at a temperature of 80° F. A current density of 15 amperes per square foot was used for a period of 15 seconds which resulted in a deposition of nickel having an average thickness of 0.18 gram of nickel per square foot of steel surface.

The nickel coated steel was then rinsed in water and dried.

A glass slip having the following composition in weight percent was then applied to the nickel coated steel by spraying:

| | Percent |
|---|---|
| Sodium silica fluoride | 7.5 |
| Dehydrated borax | 21.3 |
| Potassium nitrate | 9.2 |
| Boric acid | 5.8 |
| Silica | 38.8 |
| Titanium deoxide | 17.4 |

The glass coated steel was then fired in the manner set forth in Example 1, and the resulting glass coating was free of fishscaling and other hydrogen defects as well as having excellent adherence to the steel base even though no adherence promoting oxides, such as cobalt oxide, were employed in the glass.

*Example 3*

The steel sample, grit blasted as set forth in Example 1, was immersed in a chemical reduction bath containing, per liter of water, 30 grams of nickel chloride, 10 grams of sodium hypophosphite, 50 grams of ammonium chloride and 100 grams of sodium citrate. The bath was adjusted to a pH value of 9.2 by the addition of ammonium hydroxide.

The bath operated at a temperature of 90° C. and the steel was dipped in the bath for a period of 2.5 minutes which resulted in a nickel deposition of 0.15 gram of nickel per square foot of steel area.

The nickel coated steel was then neutralized, glass coated and fired as set forth in Example 2. The resulting glass coating was free from fishscales and boiling defects.

As the nickel coating provides excellent adherence between the glass and the steel, no adherence promoting oxide, such as cobalt oxide, need to be used in the glass composition. As the dark blue colored cobalt oxide adherence promoting material is eliminated, light or pastel shade glasses can be applied directly to the steel.

In addition to eliminating the usual adherence promoting oxide, the present invention enables a greater number of corrosion resistant glasses having lesser adherence to steel to be applied directly to the steel base.

It has been found that grit blasting to provide a surface roughness in the range of 230 to 450 microinches is essential to the present invention. If the surface roughness is below 230 microinches, the hydrogen defects will not be eliminated, while if the surface roughness is over 450 microinches, excessively high peaks are produced on the steel surface which result in black specking and copper heading type defects.

In the past, steel has been nickel plated over a surface that has been roughened by means of sandblasting or pickling in order to increase the adherence between the steel and the glass coating. A nickel coating applied over a sandblasted or pickled surface will not eliminate hydrogen defects as will the process of the invention. A sandblasted surface will, at the most, provide a surface roughness up to about 180 microinches and a shot blasted surface will provide an even smoother surface than sandblasting. Pickling, on the other hand, produces isolated pitting of the surface and is not a regular surface roughness as required by the present invention.

The use of a sandblasted or pickled surface in combination with a nickel coating as employed in the past to increase the adherence is an obvious result, in that a roughened surface will generally produce a more tightly adherent coating than a smooth surface. However, the elimination of hydrogen defects, such as fishscaling and boiling, due to the surface roughness in the range of 230 to 450 microinches, is totally unexpected and unobvious for there is no apparent relationship between surface roughness and hydrogen defects. It has been found that with a surface roughness in the above mentioned range, the hydrogen generated at the steel surface does not penetrate into the steel to the degree that it does with a surface of lesser roughness. The reason why the hydrogen penetrates into the steel to a substantial lesser degree when the surface roughness is in the range of 230 to 450 microinches, has not been fully explained.

The present invention provides a method of eliminating the hydrogen defects, such as fishscaling and reboiling in the glass surface, and also provides a tightly adherent glass coating on the steel which eliminates the use of the conventional adherence promoting oxides in the glass composition.

Various modes of carrying out the invention are contemplated as being within the scope of the following claims particularly pointing out and distinctly claiming the subject matter which is regarded as the invention.

I claim:

1. A method of applying a glass coating to steel, comprising blasting the steel with a metallic grit having a particle size of 25 to 40 mesh to provide an average surface roughness in the range of 230 to 450 microinches, depositing a layer of nickel on the roughened surface with the nickel layer having a thickness in the range of 0.08 to 0.30 gram of nickel per square foot of steel surface, applying a coating of a vitreous enamel composition directly to the coated steel surface, and firing the vitreous enamel composition at an elevated temperature to fuse the vitreous enamel to the steel.

2. A composite glass coated steel structure being substantially free of hydrogen defects, comprising a carbon steel base having a surface to receive a vitreous enamel coating, and a single coating of vitreous enamel substantially free of fishscaling and other hydrogen defects fused to the surface of the steel base, said surface being prepared for the application of said vitreous enamel by initially grit blasting said surface with grit having a particle size of 25 to 40 mesh, thereafter depositing a layer of nickel on the roughened surface with the nickel layer having a thickness in the range of 0.08 to 0.30 gram of nickel per square foot of steel surface, and subsequently firing the vitreous enamel at an elevated temperature to fuse the vitreous enamel to the steel.

3. A method of glass coating a steel surface to eliminate hydrogen defects in the coating, comprising grit blasting the steel surface with grit having a particle size in the range of 25 to 40 mesh, applying a coating of nickel to the grit blasted steel surface with the nickel having a thickness in the range of 0.08 to 0.30 gram of nickel per square foot of steel surface, applying a coating of glass to the coated steel surface, and firing the glass at an elevated temperature to fuse the glass to the steel.

References Cited in the file of this patent

UNITED STATES PATENTS

| | | |
|---|---|---|
| 2,193,640 | Navias | Mar. 12, 1940 |
| 2,223,366 | Grove | Dec. 3, 1940 |
| 2,521,846 | Gregory | Sept. 12, 1952 |
| 2,581,310 | Sweo | Jan. 1, 1952 |
| 2,666,282 | Peterson | Jan. 19, 1954 |
| 2,722,085 | De gier et al. | Nov. 1, 1955 |
| 2,748,066 | Whitehouse | May 29, 1956 |
| 2,774,688 | Girard | Dec. 18, 1956 |
| 2,821,811 | Hagenberg | Feb. 4, 1958 |

FOREIGN PATENTS

| | | |
|---|---|---|
| 680,844 | Great Britain | Oct. 15, 1952 |